United States Patent Office 3,657,427
Patented Apr. 18, 1972

3,657,427
NEMATOCIDAL USAGE OF O-ETHYL S-(2-CHLO-ROALLYLTHIOMETHYL) METHYLPHOSPHONO-DITHIOATE
John P. Chupp, Kirkwood, and Robert J. Balske, Creve Coeur, Mo., assignors to Monsanto Company, St. Louis, Mo.
No Drawing. Filed Sept. 22, 1969, Ser. No. 860,085
Int. Cl. A01n 9/36
U.S. Cl. 424—216        3 Claims

ABSTRACT OF THE DISCLOSURE

The life cycle of nematode parasites is terminated by applying a nematocidally effective amount of O-ethyl S-(2 - chloroallylthiomethyl)methylphosphonodithioate to nematode infested soil.

---

This invention relates to the nematocidal usage of O-ethyl S-(2-chloroallylthiomethyl) methylphosphonodithioate

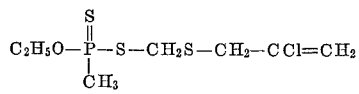

which compound and the preparation thereof is described in U.S. 3,077,432.

To illustrate the activity of the compound of this invention is the following:

To an aqueous suspension containing 10 p.p.m. of O-ethyl S-(2-chloroallylthiomethyl) methylphosphonodithioate in a glass vial is added freshly hatched larvae of the vinegar eel worm, *Turbatrix aceti,* and the vial stoppered. After 7 days at room temperature complete destruction was observed. In contrast O,O-dimethyl S-(2-chloroallylthiomethyl) phosphorodithioate (an ember oil described in U.S. 3,080,276) at the same concentration and under the same evaluating conditions was completely inactive.

The compound of this invention is active against nematode species of the genus Meloidogyne, e.g. at a concentration of 1.0 p.p.m. it gave a 100% kill of *Meloidogyne incognita* v. *acrita.*

In actual usage the compounds of this invention are added to the soil in solution, as an emulsion or water dispersion but preferably are added in a solid formulation wherein the active nematocide is to be distributed over some dry and permanently free-flowing powder such as the clays, including bentonite and attapulgite or such materials as talc, diatomaceous earth, fuller's earth, chalk, calcium carbonate and the like. These diluents possess the added advantage of lower cost treatment since normally they comprise more than 50% up to 98% of the complete formulation and thereby provide a means of more even distribution of the active material over a wider area and in the effective quantities required. These nematocidal compositions will of course attack the soil phase of the life cycle of neumatode parasites which infest animals. Treating barnyards, chicken pens, stable and other infested areas destroy eggs and infestive larvae of many parasites which infest animals.

In the use of the compound of this invention as a nematocide the active compound, diluted or undiluted, can be applied to the soil at rates of 5 to 100 pounds per acre. The preferred application for treating soils of average nematode infestation will be from 10 to 50 pounds per acre. The formulation may contain dispersants which aid uniform distribution.

What is claimed is:
1. A method of destroying nematode parasites which comprises contacting said nematode parasites with a nematocidally effective amount of O-ethyl S-(2-chloroallylthiomethyl) methylphosphonodithiote.
2. The method of claim 1 wherein the nematode parasites are present in the soil and the phosphonodithioate is employed at the rate of 5 to 100 pounds per acre.
3. The method of claim 1 wherein the nematode is a species of the genus Meloidogyne.

References Cited
UNITED STATES PATENTS
3,077,432    2/1963    Chupp et al. _____ 424—216

ALBERT T. MEYERS, Primary Examiner
L. SCHENKMAN, Assistant Examiner